Patented Nov. 2, 1937

2,097,481

UNITED STATES PATENT OFFICE 2,097,481

RUBBER

Leo Wallerstein, New York, N. Y.

No Drawing. Application January 9, 1933, Serial No. 650,892. Renewed January 26, 1937

16 Claims. (Cl. 18—50)

The present invention relates to the treatment of latices, such as rubber latex, and it particularly relates to the treatment of such hydrocarbon suspensions in preserved condition to remove non-hydrocarbon materials, such as protein, therefrom.

It has been found that the protein content of rubber disadvantageously affects the electrical characteristics of the rubber, and particularly decreases its desirable insulating and dielectric qualities, particularly when the rubber is utilized where it is in contact with water for long periods of time, as in submarine cables. In addition the non-hydrocarbon or protein materials usually present in rubber latex and consequently in coagulated rubber itself, as well as other similar coagulated hydrocarbons, disadvantageously affect the quality of the rubber, its chemical reactivity and the readiness with which it is converted by chemical and/or physical treatments.

Since non-hydrocarbon materials, such as protein, occur in rubber in very small amount, the nitrogen content being substantially less than 1%, it is not satisfactory to employ treatments to remove this small percentage of material, which might at all substantially affect the rubber hydrocarbon itself. Treatments of large masses of rubber after coagulation or separation from latex, as for example with water with high temperature and pressure for extended periods of time and/or by disintegration of the rubber are not economical, nor are they particularly effective in reducing the non-hydrocarbon content.

An object of this invention is to prepare rubber or rubber latex, and similar hydrocarbon materials in a relatively high state of purity with a substantial reduction in the nitrogen or protein content without the necessity of utilizing extended treatments at high temperatures and pressures over extended periods of time before or after coagulation, and which will not cause any undesirable change or alteration in the valuable hydrocarbon constituents which it is desired to prepare in a high state of purity.

Another object is to prepare rubber hydrocarbon material substantially free of protein by a selective treatment which will eliminate and decrease the protein content to a desired degree without affecting other constituents of the rubber, particularly the rubber hydrocarbons.

Another object is to provide a rubber treatment operation which may be carried out under such controlled and regulated conditions that the purification or removal treatment will proceed to the desired extent, whether the rubber remains in the condition of a latex throughout the process, or is converted during the process into a coagulated mass, without the necessity of subjecting the coagulated rubber to drastic treatments to remove the protein therefrom other than washing.

Another object is to provide a protein removal process for rubber and rubber material in which the protein is converted into such condition that it may be readily removed by washing the treated rubber material.

Another object is to provide a purified rubber material by a protein removing treatment which will not result in the occlusion of added impurities, and which will not tend to cause, or set up reactions tending to cause putrefaction and decomposition of the latex or rubber, although reagents of organic origin are utilized.

Other objects are in part obvious and in part pointed out hereinafter.

The present invention contemplates the treatment of rubber or similar hydrocarbons in the form of aqueous suspensions or latices, in preserved condition, with enzymes, particularly with enzyme mixtures such as are derived incidently to the growth and metabolic processes of bacteria in nutrient media, as for example bacillus mesentericus, and bacillus subtilis. In reacting the rubber hydrocarbon suspension of the latex with the enzyme material or mixture, it is desirable that the enzyme be used in relatively small quantities, yet sufficiently to solubilize the nitrogen protein content of the rubber material so that after washing it will be reduced from 33 to 80% within a period preferably not exceeding about 100 hours and ranging from 24 hours to 100 hours or 1 to 4 days. Usually, it is desirable to add such quantity of enzyme and of sufficient strength that the nitrogen protein content of the rubber material after washing will be reduced at least 66% in a period preferably from 24 hours or to about 48 hours.

The enzyme is preferably always used in such concentrations and under such conditions that it will not of itself cause coagulation, although coagulation may be simultaneously affected by suitable control of the acid concentration and pH value. In one embodiment of the invention a nitrogen content of between 0.32 and 0.335% was reduced to between 0.06% and 0.16% in from 6 to 40 hours.

In the enzyme reaction, the latex to which the enzyme is added may be utilized in undiluted condition, or it may be diluted by 1 to 5 volumes of water, the average dilution, if dilution is employed, usually being about 3 to 4 times.

Whether or not the dilution is preferred, it is desirable to reduce the alkalinity or pH value of the latex, which usually has an initial alkalinity of between pH 10 and pH 11 to between about 8.5 to 9.0 and in some instances to as low as between 7 and 8.5. This reduction of pH or alkalinity of the latex may be accomplished by a weak acid, suitable acids being carbonic, sulphurous, boric and phosphoric. Stronger or mineral acids may also be employed in substantial dilution, and organic acids may also be added.

The alkalinity may also be reduced by subjecting the preserved latex to physical treatments to remove some of the ammonia as by aeration and/or by stirring and removing the evolved ammonia with a current of air.

In reducing the pH value or alkalinity of the latex by addition of acid to below pH 8, the rubber material tends to coagulate. Under such conditions assurance should be had that sufficient of the enzyme mixture or material is occluded in the coagulate to cause the desired decomposition or splitting of the protein within the rubber mass so formed, if the protein decomposition has not reached the desired state of completion prior to the coagulation.

The temperature of the reaction is desirably controlled so that an average temperature of substantially more than atmospheric and not substantially over 65° C. will be maintained throughout the period of activity of the enzyme, the best range of temperature being from 40 to 60° C. and averaging about 45 to 50° C.

Uncoagulated rubber, as in the form of latex or in other forms, may also be conveniently substantially deproteinized as described above by adding the enzyme preparation and then removing the solubilized protein materials without coagulation. This may be accomplished by removal of water from the latex so treated, as by creaming or centrifuging, followed, if desired, by one or more subsequent additions of water and dewatering operations. The deproteinization process of the present invention is broadly applicable to suspensions, emulsions, latices and similar materials from which it is desired to remove protein materials.

The following are a few examples of some of the modes of carrying out the present invention, and they are given here for purpose of illustration and not by way of limitation:

Example 1

400 pounds or 50 gallons of an alkaline latex are mixed with an acid solution containing 1200 pounds (about 150 gallons) of water and 3300 c. c. of concentrated syrupy phosphoric acid of about 85% strength. To the latex preferably before or during the addition of water and acid is added 31 pounds (14 liters) of proteolytic enzyme preparation of bacterial origin as previously described. The proper proportions of the enzyme may be readily determined by first conducting a small scale control process. This mixture is permitted to stand for about 40 hours at 45 to 60° C. and then the rubber hydrocarbon is precipitated with approximately 28 liters of an acetic acid solution. This treatment results in a reduction of the nitrogen protein content after washing of the rubber from between 0.32% and 0.35% to 0.07%.

Example 2

100 grams of latex are diluted with 300 grams of water, and before, during or after the dilution, about 4 c. c. of a proteolytic enzyme preparation, as above described, are added. With a pH of 10.5 and with an average temperature of 45° C., after about 20 hours the nitrogen protein content will have been reduced from 0.35% to 0.14%.

If desired, the alkalinity may be reduced to about pH 8.5 by bubbling carbon dioxide through the mixture for a period of 5 to 8 minutes, and also, if desired, the time of digestion may be reduced to 6 to 18 hours.

One-half gram of sodium hydrogen sulphite may also be added to the reaction mixture, preferably with the diluting water.

Example 3

100 c. c. of latex are diluted with 400 c. c. of water and to the mixture before, during or after the dilution is added, 4 c. c. of a bacterial enzyme preparation. To the resultant solution may then be added a small quantity of sulphurous acid or a desired amount of boric acid to reduce the alkalinity. With a temperature of 46 to 48° for a period of 18 hours the nitrogen protein content may be readily reduced from 0.35% to between 0.09% and 0.1% after washing.

The boric acid may be conveniently used in any concentration from 0.5 to 5% and preferably is used in amount of about 3 to 4%, the acid being desirably present in sufficient concentration to maintain a pH value of 8.3.

Example 4

100 c. c. of rubber latex are mixed with 400 c. c. of water and 5 c. c. of a bacterial enzyme preparation. The mixture preferably is partly acidified, or its alkalinity is reduced during the dilution process, by the addition of a small quantity of phosphoric acid. Upon standing from 20 to 28 hours the protein nitrogen content after washing will be reduced from between 0.35% and 0.4% to 0.1%.

The phosphoric acid may be added as a 10% solution and in amounts ranging from about 7 to 19 c. c. of such phosphoric solution with the diluting water.

Instead of phosphoric acid, acid phosphates, such as sodium dihydrogen phosphate, may be employed.

Although the preferred enzyme material is of bacterial origin and is desirably produced by the metabolic processes of selected bacilli, and as utilized usually contains other metabolic products of the bacilli, such as the decomposition products of carbohydrates and proteins, certain other enzymes may be utilized under suitably controlled and regulated conditions. Among these other enzymes are papain and trypsin.

The following are a few illustrative examples of the utilization of such other enzymes:

Example 5

To 100 c. c. of latex may be added 400 to 500 c. c. of water and about 0.25 gram of a papain preparation. It is also preferable to add to the diluting water or to the resultant mixture 14 c. c. of 10% phosphoric acid solution or an equivalent amount of boric acid. With resultant reduction of the pH to about 8, at an average temperature of 48° C. and a digestion period ranging from 18 to 22 hours, a reduction in protein nitrogen content to 0.06% and 0.12% after washing is readily achieved.

If desired, the pH value may be reduced to 5 by the addition of a larger amount of phosphoric acid, as for example with the particular proportions stated above, 33 c. c. of phosphoric acid. The amount of papain may be varied from 0.25 to 0.4 gram, and if desired, about 0.0125 to 0.025 gram of sodium hydrogen sulphite may be added.

*Example 6*

In utilizing trypsin about 0.167 gram of this enzyme in a suitable preparation may be incorporated in a mixture of 100 c. c. latex, 400 c. c. of water and 14 c. c. of 10% phosphoric acid. With a digestion period of 20 hours and a temperature of 48° a reduction in protein nitrogen content after washing to between 0.17% and 0.1% will be readily obtained. If desired, the amount of phosphoric acid may be varied from 15 to 19 c. c. and the amount of trypsin may range from 0.08 to 0.35 gram per 100 c. c. of latex.

Instead of using the enzyme singly, as above described, it is convenient in certain instances to use mixtures of them, as for example mixtures of trypsin and bacterial enzyme preparations, of papain and bacterial enzyme preparations and/or of trypsin, papain and the bacterial enzyme preparations.

It is an important feature of the present invention that the enzyme is incorporated with the latex before coagulation, while the protein decomposition products, in part or whole, are removed from the coagulated rubber as by washing. By suitably regulating the acid concentration, the solubilization of the proteins by the enzymes may be substantially completed prior to coagulation, or may be completed in large part after the rubber has been coagulated. For this reason it is desirable at all times to incorporate sufficient enzyme in the latex so that whether the protein decomposition is complete before or after coagulation, there will always be sufficient enzyme to complete the process. At the same time the enzyme is not utilized under such conditions and with such temperatures and pH value as to cause coagulation of the rubber hydrocarbon, such coagulation being caused solely by suitable regulation of the pH value of the latex, preferably with a weak or dilute acid, and most desirably with the addition of buffer-forming acids, such as boric and phosphoric.

The enzyme mixture should preferably be added in such quantity as to reduce the nitrogen content based upon the assumption of an initial nitrogen content of between 0.32 and 0.35% to between 0.060 and 0.16%.

As stated above the preferred enzyme preparation is one of bacterial origin and it may contain metabolic decomposition products which are produced by the bacteria while it is generating the enzyme. Bacterial enzyme preparations of this character have been found to be most efficient in solubilizing the protein content of the rubber material and further they greatly decrease the possibility of any deterioration of the rubber material during the process.

Although the preferred raw material for treatment is rubber latex preserved with ammonia, other latices may be utilized, as may also other preservatives than ammonia. The enzyme treatment process of the present invention may be conveniently employed to treat rubber suspensions or latices which are to be subsequently subjected to an electro-deposition process. The solubilized proteins will be left in the bath and/or may be removed by washing the plated rubber materials.

Having thus described my invention what I claim as new and desire to secure by Letters Patent is:

1. A process of producing substantially deproteinized rubber from rubber latex comprising providing an alkaline latex, reacting an active enzyme preparation with the latex, coagulating with an acid and then washing, the enzyme preparation being used in such concentrations as to solubilize about 66% the protein in 12 to 24 hours.

2. A process of producing substantially deproteinized rubber from rubber latex comprising providing an alkaline latex, reacting an active enzyme preparation with the latex, coagulating with an acid and then washing, the pH being maintained at about 8 during the digestion operation.

3. A process of producing substantially deproteinized rubber from rubber latex comprising providing an alkaline latex, reacting an active protease preparation with the latex in amounts ranging from 0.5 to 10% of the latex, coagulating with an acid and then washing.

4. A process of producing substantially deproteinized rubber from rubber latex, comprising providing an alkaline latex, reacting an active protease preparation with the latex, maintaining the pH of the latex so as to prevent coagulation, and then coagulating with an acid and washing the coagulate, the protease preparation being used in such amount as to reduce the protein nitrogen content of the rubber after washing to between 0.04 and 0.16% in from 6 to 48 hours.

5. A process of producing substantially deproteinized rubber from rubber latex which comprises providing an ammoniacal latex with a pH of between 10 and 11, adding a proteolytic enzyme preparation and an acid in sufficient quantities to reduce the pH to between 8 and 9, allowing the reaction to continue for a sufficient length of time to solubilize the proteins, coagulating with an acid and washing.

6. A process of producing substantially deproteinized rubber from rubber latex which comprises providing an ammoniacal latex with a pH of between 10 and 11, adding a proteolytic enzyme preparation and an acid in sufficient quantities to reduce the pH to between 8 and 9, allowing the reaction to continue for 6 to 72 hours, coagulating with an acid and washing.

7. A process of producing substantially deproteinized rubber from rubber latex which comprises providing an ammoniacal latex with a pH of between 10 and 11, adding a proteolytic enzyme preparation and an acid in sufficient quantities to reduce the pH to between 8 and 9, allowing the reaction to continue for 1 to 3 days, coagulating with an acid and washing.

8. A process of producing substantially deproteinized rubber from rubber latex which comprises providing an alkaline latex, adding a phosphoric acid to said latex to reduce the alkalinity thereof, adding a proteolytic enzyme preparation of bacterial origin, permitting the mixture to stand for forty hours and at a temperature of 45 to 60 degrees C. and then coagulating with an acid, the enzyme being utilized in insufficient concentration and strength to cause coagulation, but being used in such quantity that there will be a reduction in the protein nitrogen content from about 0.32 to about 0.07 per cent.

9. A process of producing substantially deproteinized rubber from rubber latex which comprises providing an alkaline latex, diluting said latex and adding a proteolytic enzyme preparation thereto, maintaining an average temperature of about 45 degrees C. and a pH of about 8.0 for about twenty hours and then coagulating with an acid, the proteolytic enzyme preparation being utilized in insufficient strength to cause coagulation, but being used in such strength to cause reduction of the protein nitrogen content from about 0.35 to 0.14.

10. A process of producing substantially deproteinized rubber from rubber latex which comprises providing an alkaline latex, diluting said latex and adding thereto a bacterial enzyme preparation, slightly reducing the alkalinity by the addition of sulphuric acid and maintaining a temperature of about 46 to 48 degrees C. for a period of about eighteen hours, said bacterial enzyme preparation being utilized in insufficient quantity in strength to cause coagulation and in sufficient strength to cause reduction of the protein nitrogen content from about 0.35 per cent to about 0.1 per cent after washing of the coagulated product.

11. A process of producing substantially deproteinized rubber from rubber latex which comprises providing an alkaline latex, diluting the same with water and adding a papain preparation, reducing the alkalinity of the latex with phosphoric acid, maintaining a temperature of about 48 degrees C. and a pH of about 8 for eighteen to twenty-two hours, coagulating and then washing the coagulated product, the papain preparation being utilized in insufficient quantity to coagulate the latex, but being utilized in such quantity to reduce the nitrogen protein content to about 0.1 per cent after washing of the coagulate.

12. A process of producing substantially deproteinized rubber from rubber latex which comprises providing an alkaline latex, diluting said latex with four times its volume of water, reducing the alkalinity of said latex with phosphoric acid, incorporating a substantial amount of trypsin in the mixture in amount of less than 1 per cent of the mixture, continuing the digestion for twenty hours at a temperature of about 48 per cent, coagulating with acid and then washing.

13. A process of producing substantially deproteinized rubber from rubber latex comprising providing an alkaline latex, reacting an active proteolytic enzyme preparation with the latex, maintaining a pH of 8, coagulating with an acid and washing.

14. A process of producing substantially deproteinized rubber from rubber latex comprising providing an alkaline latex, reacting an active bacterial enzyme preparation derived by growth and metabolic reaction of bacilli mesentericus and subtilis upon nutrient media, coagulating with an acid and washing.

15. A process of producing substantially deproteinized rubber from rubber latex, comprising providing an alkaline latex, reacting an active proteolytic enzyme preparation with the latex, reducing the pH with a buffer-forming acid, coagulating with an acid and washing.

16. A process of producing substantially deproteinized rubber from rubber latex which comprises providing an alkaline latex, diluting the same with water and adding a bacterial enzyme preparation, reducing the alkalinity with a small amount of phosphoric acid, permitting the digestion to continue for twenty to twenty-eight hours, coagulating and then washing the coagulated product, about one hundred parts of latex being utilized and being diluted with about four hundred parts of water and about five parts of the bacterial enzyme preparation being added to the resultant mixture.

LEO WALLERSTEIN.